Patented Oct. 2, 1923.

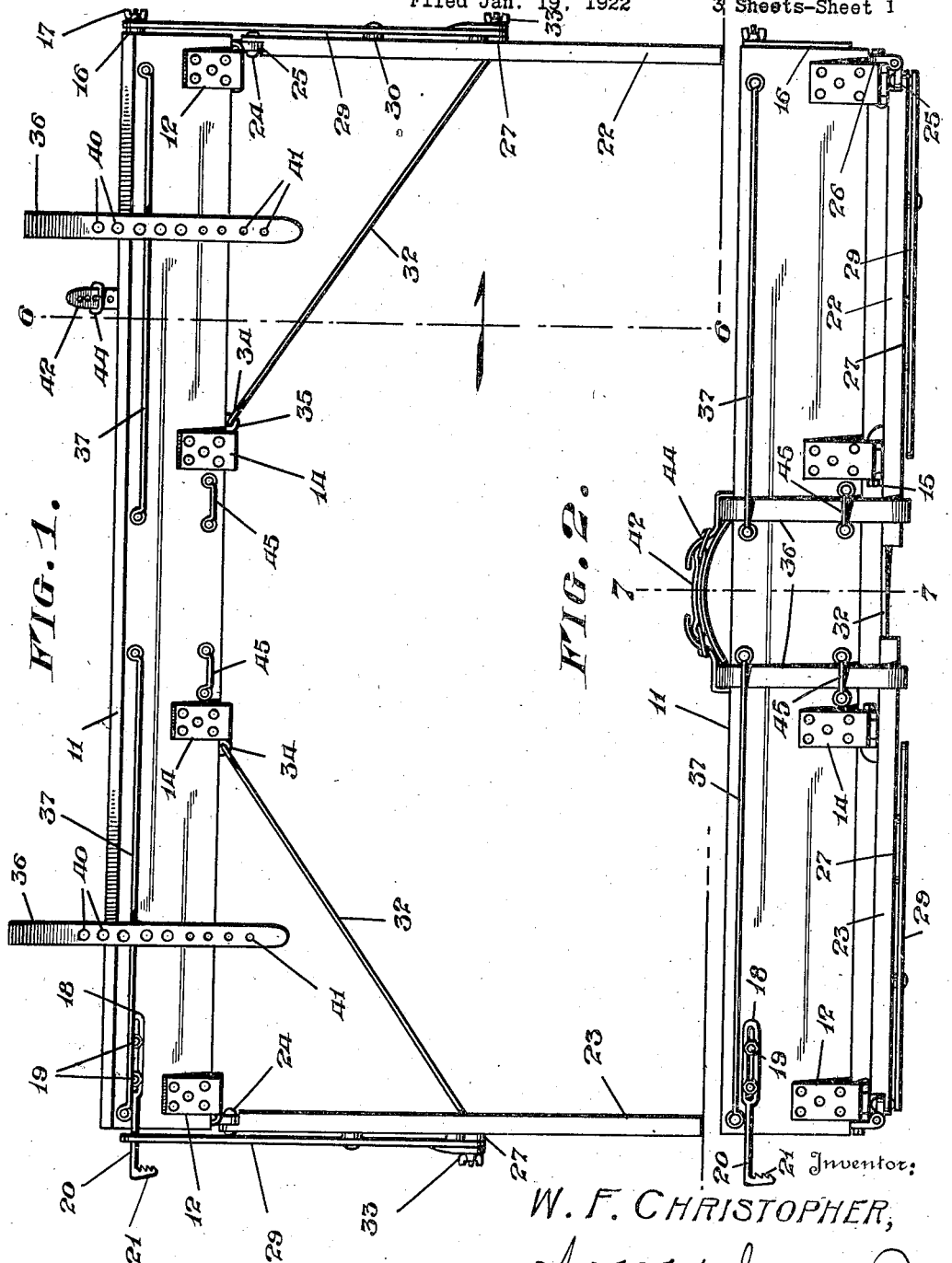

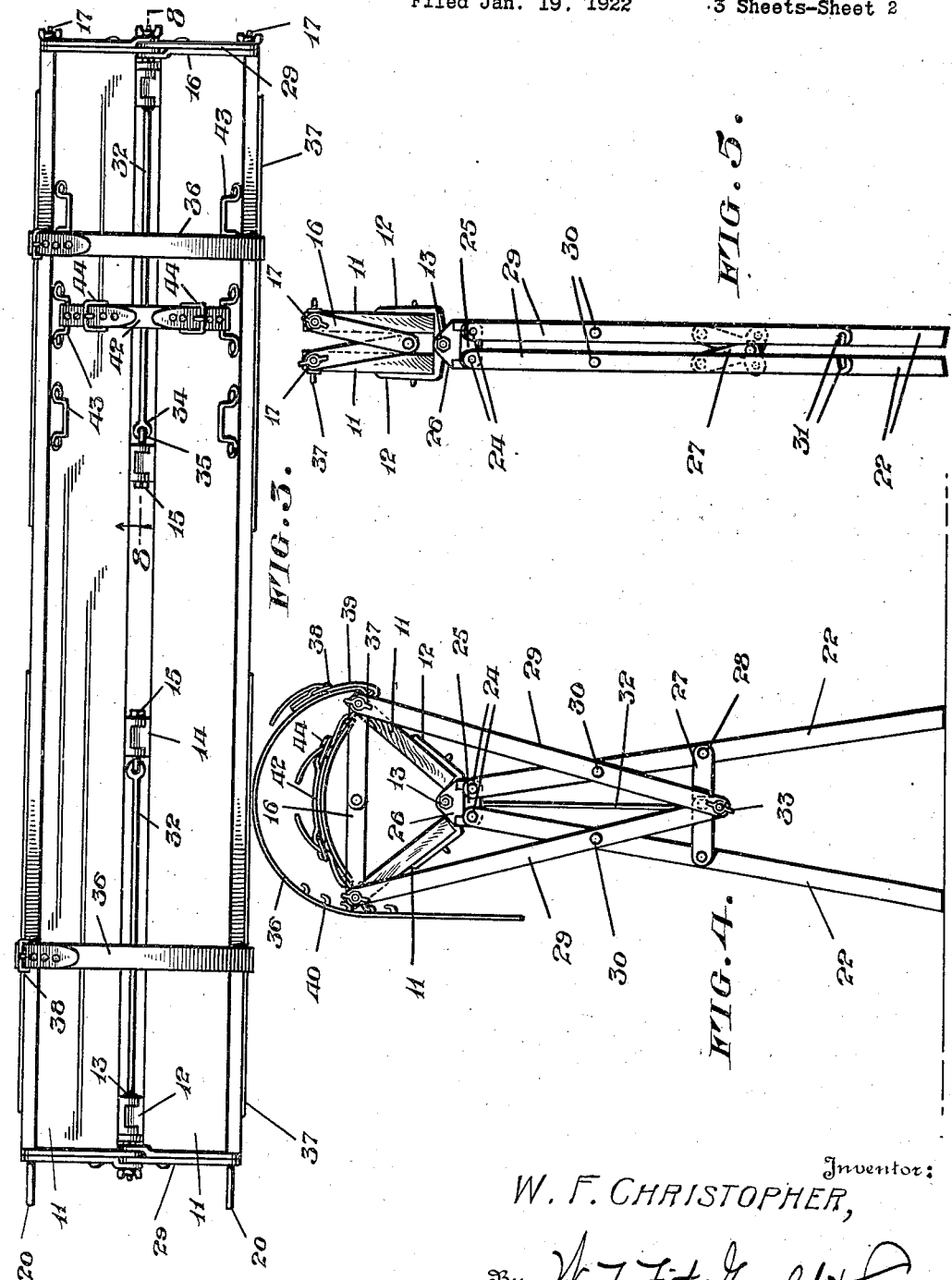

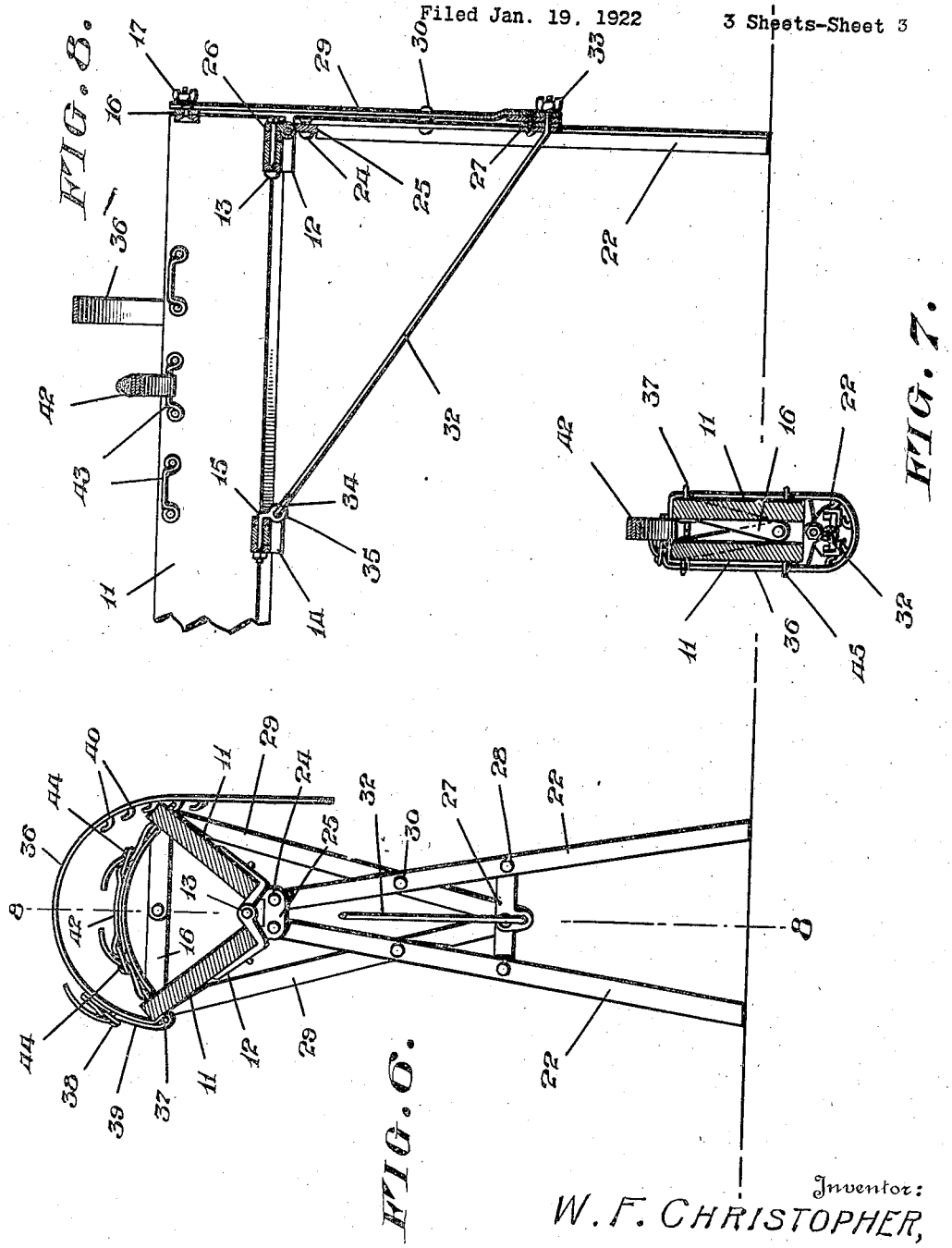

1,469,496

UNITED STATES PATENT OFFICE.

WILLIAM F. CHRISTOPHER, OF AUBURN, IOWA.

FOLDING ANIMAL-OPERATING TROUGH.

Application filed January 19, 1922. Serial No. 530,393.

*To all whom it may concern:*

Be it known that I, WILLIAM F. CHRISTOPHER, a citizen of the United States, residing at Auburn, in the county of Benton and State of Iowa, have invented certain new and useful Improvements in Folding Animal-Operating Troughs; and I do hereby declare the following to be a full, clear, and exact description of the invention, such as will enable others skilled in the art to which it appertains to make and use the same.

The present invention relates to a folding or collapsible trough or tray adapted especially for holding a hog or other animal while being operated on, and an object of the invention is the provision of such a device comprising a novel construction whereby the device can be compactly folded or collapsed when not in use, as well as providing a serviceable and efficient means for supporting the animal during the operation, the present invention being an improvement over the construction disclosed in my co-pending application serial No. 498,645, filed September 6, 1921.

Another object is the provision of such a device including supporting legs and braces for the trough constructed and arranged to fold into compact relation with the trough, and when unfolded and positioned serving to efficiently support the trough during the operation, or use of the device.

A further object is the provision of such a device having straps or equivalent means for holding down the animal during the operation, and also adapted for holding the device in folded or collapsed position, and for conveniently carrying same.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a side elevation of the improved structure.

Fig. 2 is a side elevation thereof in folded position.

Fig. 3 is a plan view of the trough in open position.

Fig. 4 is a front end view of the device in open or erected position.

Fig. 5 is a front end view showing the trough and legs folded prior to the swinging of the legs against the trough.

Fig. 6 is a cross section on the line 6—6 of Fig. 1.

Fig. 7 is a cross section on the line 7—7 of Fig. 2.

Fig. 8 is a longitudinal section on the line 8—8 of Fig. 6.

The trough or tray comprises the opposite sides 11, which may be boards or other suitable material, and said sides have their lower edges hinged together, whereby the sides can be swung apart at about a right angle with one another, with said sides diverging upwardly, as seen in Figs. 4 and 6. The sides can also be swung together, in folding the device, as seen in Figs. 5 and 7. The end hinges adjacent to the ends of the sides comprise the angular hinge leaves 12 hingedly connected by the hinge pins 13, and there are two intermediate hinges of similar construction, having the angular hinge leaves 14 hingedly connected by the hinge pins 15. The hinge leaves are secured to the outer surfaces and lower edges of the sides 11, with the hinge pins located between the lower edges of said sides, as clearly seen in Figs. 6 and 7.

In order to limit the opening of the trough or the separation of the sides 11, a jointed stay 16 is disposed at the forward end of the trough, and has its ends pivotally engaging bolts 17 carried by the forward ends of the sides 11 adjacent to the upper edges of said sides. Said stay will straighten out when the trough is opened, to limit the separation of the sides 11, and said stay can be "broken" to fold, as seen in Fig. 5, with the trough.

The trough is provided at its rear end with means for attaching said end of the trough to the upper edge of a wall, fence, board or other support. Thus, slotted bars 18 slidably engage clamping bolts 19 carried by the sides 11 at the outer surfaces thereof near the upper edges and rear ends of said side, and said bars have stems or shanks 20 projecting rearwardly beyond the rear ends of the sides and formed with depending jaws or hooks 21. Said stems or shanks can extend over the support, with the jaws or hooks engaging behind said support, and the bars 18 can be adjusted for clamping the support between said jaws and rear end of the trough, and by tightening the bolts 18, the trough is clamped or secured rigidly to the support.

Pairs of front and rear legs 22 and 23, respectively, are also provided for the trough. These legs have their upper ends overlapping and pivoted, as at 24, to hinge leaves 25, whereby said legs of each pair can be swung laterally toward and away from one another about the pivots 24. The hinge leaves 25 are hinged to companion leaves 26, for the swinging movement of the legs about transverse axes toward and away from the bottom of the trough. The hinge leaves 26 pivotally engage the hinge pins 13. The legs of each pair can thus be swung together, as seen in Fig. 5, and then swung against or adjacent to the lower edges of the sides 11, as seen in Figs. 2 and 7.

A jointed stay 27 is provided for each pair of legs and has its ends overlapping and pivoted to the legs, as at 28. Said stays can be "broken" to fold with the legs, and when the legs are swung apart, said stays are straightened out to limit the separation of said legs.

Pairs of braces 29 are provided at the opposite ends of the trough, and are pivoted between their ends, as at 30, to the legs between the pivots 25 and stays 27 of the legs. The braces 29 have slots 31 near their upper ends, whereby the upper ends of the front braces 29 can engage the bolts 17, and the upper ends of the rear braces 29 can engage the stems or shanks 20, for attaching said upper ends of the braces to the opposite ends of the sides 11, in order to hold the trough in proper position when opened.

Inclined brace rods 32 have their lower terminals inserted through apertures in the stays 27, and the lower ends of the braces or bars 29 have apertures to engage over said terminals of the rods or braces 32, and nuts 33 are threaded on the lower terminals of said rods 32, for clamping the rods 32, stays 27 and braces 29 together. This will make the supporting structure rigid, and the rods 32 have eyes 34 at their upper ends engaging depending eyes 35 with which the hinge pins 15 are provided. The rods or braces 32 thus brace the legs against longitudinal swinging movement, and the braces 29 and stays 27 brace the legs and sides of the trough laterally. The rods 32 are also pivotally anchored to the intermediate hinges, so as to enable said rods to be swung against the lower edges of the sides 11, when the structure is folded.

Straps 36 extend transversely across the trough for holding down the legs of the animal, and longitudinal rods 37 have their terminals secured to the outer surfaces of the sides 11 near the upper edges thereof, whereby the straps can be attached to said rods at different longitudinal positions over the trough. Each strap 36 has a buckle or clasp 38 thereon near one terminal, so that said terminal can be engaged behind and around the corresponding rod 37 to form a loop 39 with the terminal engaging said buckle or clasp. Each strap is also provided at its lower or inner surface with a longitudinal series of hooks 40 to engage under the opposite rod 37, and providing means of adjustment in addition to the buckle or clasp 38, whereby each strap can be drawn down tight for holding the legs of the animal down firmly. Each strap is also provided near the terminal opposite to the buckle 38 with a longitudinal series of apertures 41 for the engagement of such terminal with the buckle 38 when using the straps 36 for holding the trough in folded position, as will hereinafter more fully appear.

Another transverse strap 42 is used for holding down the head of the animal, and has buckles or clasps 44 thereon near the center of the strap, and loop members or keepers 43 are secured to the inner surfaces of the sides 11 near the upper edges thereof and near one end of the trough where the head of the animal is located. There is a longitudinal series of members 43 arranged in pairs transversely of the trough, for the positioning of the head-holding strap 42 at different longitudinal positions. The terminals of the strap 42 can be inserted through and looped around the members 43 and engaged with the buckles or clasps 44. Loop members 45 are also secured to the outer surfaces of the sides 11 near the lower edges thereof and at the intermediate portion of the trough below the adjacent end portions of the rods 37, for the insertion of the straps 36 when they are used for holding the trough folded together.

The present structure is especially useful for operating on animals, but can be put to other uses also. The trough can be supported by the legs 22 and 23, or the legs 23 and corresponding parts can be detached or eliminated, and the rear end of the trough fastened by the jaws or hooks 21 over the upper edge of a fence, wall, or other similar support. The straps 36 are slidable or adjustable longitudinally to be disposed properly over the legs or body of the animal, and the hooks 40 enable the straps to be tightened down and secured by engaging the respective hooks under the corresponding rods 37. The head-holding strap 42 can also be disposed at different longitudinal positions and can be tightened for holding the head down on the bottom of the trough.

In folding the structure, the hooks 40 are detached from the rods 37, and the strap 42 also detached from the members 43. The braces 29 are then disengaged from the bolts 17 and stems 20, and the rods 32 withdrawn from the stays 27 and braces 29 by swinging the legs slightly away from the center of the trough. The braces 29 can then be reversed, as seen in Fig. 5, and the legs swung together, with said braces lying between the ends of the legs, and the stays 27 folded together also. The sides 11 of the trough can be folded together, which will also fold the stay 16. The rods or braces 32 can then be swung toward one another against the lower edges of the sides 11, and the pairs of legs also swung toward one another against the lower edges of said sides 11. This will fold the structure within small space, for conveniently carrying, transporting or storing the device. The straps can be used for holding the device in folded position and for carrying same. Thus, the straps 36 can be inserted through the members 45 and rods 37, as seen in Figs. 2 and 7, and the terminals which have the apertures 41 can be engaged in the buckles or clasps 38, whereby said straps embrace the sides and legs of the folded structure, to hold them together. The terminals of the strap 42 are then engaged around the straps 36 above the upper edges of the sides 11, as seen in Fig. 2, and are engaged with the buckles 44, whereby said strap 42 provides a handle or grip for conveniently lifting and carrying the device.

Having thus described the invention, what is claimed as new is:—

1. A foldable operating trough having sides adapted to fold together, members attachable to said sides of the trough for holding an animal down in the trough, and also adapted to embrace the trough for holding the sides folded, and another member also attachable to said sides to assist in holding the animal down in the trough and attachable to the aforesaid members when they embrace the trough to provide a carrying handle.

2. An operating trough having sides foldable together, a strap having one terminal connected to one side of the trough and having a clasp or buckle near said terminal, the strap having a longitudinal series of portions near its other terminal and the opposite side of the trough having means for the engagement of said portions, and the lastnamed terminal of the strap being engageable with said clasp or buckle, when the sides are folded, for holding said sides in folded position.

3. An operating trough including sides hinged at their lower edges to swing together, and legs hingedly connected with the trough to swing together and against the lower edges of said sides.

4. An operating trough including sides hinged at their lower edges to swing together, a pair of legs pivotally and hingedly connected to the trough to swing together and to swing against the lower edges of said sides, and bracing means to be secured to said legs and trough, when unfolded, for holding the legs and sides of the trough in place.

5. An operating trough comprising sides adapted to fold together and to be moved apart transversely, a pair of legs connected to the trough to fold together adjacent to the trough and to be moved apart transversely when unfolded independently of said sides, and braces foldable transversely to be folded with the legs and sides and arranged to be moved apart transversely, independently of said sides, for connecting the legs and sides for holding them in place when moved apart transversely.

6. An operating trough comprising sides hinged to swing together and apart transversely, a pair of legs connected to the trough to swing together and against the trough and to swing apart transversely when unfolded independently of said sides, and braces pivoted to the legs to be folded therewith and to be swung apart transversely when unfolded independently of said sides, the sides of the trough having means for the engagement of said braces when the parts are unfolded.

7. An operating trough having sides foldable together and movable apart transversely, legs connected to the trough to fold together against the trough and movable apart transversely when unfolded independently of said sides, means for connecting the legs and sides for preventing relative transverse movement thereof when unfolded, and a brace between the trough and legs for preventing movement of the legs longitudinally of the trough and adapted to be folded against the trough.

8. An operating trough comprising sides adapted to fold together and to move apart transversely, a pair of legs pivotally and hingedly connected to the trough to swing together and to swing against the trough and to be swung apart transversely, independently of said sides, when swung away from the trough, means for connecting said legs and sides for retaining them in position against relative transverse movement, and a brace pivotally connected with the trough for bracing the legs against movement longitudinally relatively to the trough, said brace being swingable against the trough when disconnected from the legs.

9. An operating trough having sides foldable together and movable apart, legs connected to the trough to fold together against the trough and to be unfolded independently of the folding and unfolding of said sides, and means for connecting the sides and legs when they are unfolded, for retaining them in relative position.

10. An operating trough comprising sides hinged to swing together and apart, legs pivotally and hingedly connected to the trough to fold together against the trough and to be unfolded independently of the folding and unfolding of said sides, and bracing means foldable with the other parts and arranged for connecting the sides and legs when they are unfolded to retain them in relative position.

11. An operating trough comprising sides, hinges connecting the lower edges of the sides so that the sides can be swung together, a pair of legs pivotally and hingedly connected to one hinge to be swung together and to be swung against the lower edges of said sides, and a brace for said legs pivotally connected to another hinge to be swung against the lower edges of said sides when the brace is disengaged from said legs.

12. An operating trough, a pair of legs connected to the trough to fold together against the trough, a jointed stay connecting said legs for holding them apart when unfolded, and a brace for connecting said stay and trough.

13. An operating trough, a pair of legs connected to the trough to swing together and to swing against the trough, a jointed stay connecting said legs for holding them apart when unfolded, and a brace pivotally connected to the trough to swing against the trough and having means for detachably engaging said stay when the legs are unfolded.

14. An operating trough, a pair of legs connected to the trough to fold against the trough, braces for connecting said legs and sides of the trough, and another brace for connecting the trough and aforesaid braces.

15. An operating trough having sides foldable together, a pair of legs connected to the trough to fold together against the trough, braces pivoted to the legs and attachable at their upper ends to the sides of the trough, and a brace engageable with the aforesaid braces and connected to the trough at a point spaced longitudinally from the legs.

16. An operating trough comprising sides foldable together, a pair of legs connected to the trough to fold together against the trough, a jointed stay connecting said legs for holding them apart when unfolded, braces for said legs attachable to the sides of the trough, and a brace connected to the trough at a point spaced longitudinally from said legs and having a portion to engage said stay and braces.

17. An operating trough comprising sides hinged together at their lower edges to swing together, a pair of legs pivotally and hingedly connected to said trough to swing together and to swing adjacent to the lower edges of said sides, a jointed stay connecting said legs for holding them apart when unfolded, braces pivoted between their ends to said legs between said stay and trough and having portions at their upper ends to be attached to said sides, with the lower ends of the braces overlapping said stay, and a brace connected to the trough at a point spaced longitudinally from said legs and having a portion engageable with said stay and lower ends of said braces.

In testimony whereof I have signed my name to this specification in the presence of two subscribing witnesses.

WILLIAM F. CHRISTOPHER.

Witnesses:
BERYL LORMOR,
FORREST ABBOTT.